US006219705B1

(12) United States Patent
Steinberger et al.

(10) Patent No.: US 6,219,705 B1
(45) Date of Patent: Apr. 17, 2001

(54) SYSTEM AND METHOD OF COLLECTING AND MAINTAINING HISTORICAL TOP COMMUNICATOR INFORMATION ON A COMMUNICATION DEVICE

(75) Inventors: Robert A. Steinberger, Largo; Jaime Colom, Clearwater, both of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/288,949

(22) Filed: Apr. 9, 1999

Related U.S. Application Data
(60) Provisional application No. 60/108,122, filed on Nov. 12, 1998.

(51) Int. Cl.[7] ............................. G06F 15/173; G06F 15/16
(52) U.S. Cl. ......................... 709/224; 709/223; 709/232
(58) Field of Search ...................................... 709/211, 212, 709/217, 223, 224, 232; 364/138; 340/825.06, 825.07, 825.08; 702/186, 187

(56) References Cited

U.S. PATENT DOCUMENTS

| 4,569,044 | * | 2/1986 | Tao et al. | 370/451 |
|---|---|---|---|---|
| 5,039,980 | * | 8/1991 | Agger et al. | 340/506 |
| 5,537,141 | * | 7/1996 | Harper et al. | 348/12 |
| 5,537,542 | * | 7/1996 | Eilert et al. | 709/201 |
| 5,634,009 | * | 5/1997 | Iddon et al. | 709/223 |
| 5,635,848 | * | 6/1997 | Hammond et al. | 324/758 |
| 5,835,757 | * | 11/1998 | Oulid-Assa et al. | 707/10 |
| 5,912,633 | * | 6/1999 | Allicon et al. | 340/870.02 |
| 5,913,037 | * | 6/1999 | Spofford et al. | 709/226 |
| 5,958,009 | * | 9/1999 | Friedrich et al. | 709/224 |
| 5,991,806 | * | 11/1999 | McHann, Jr. | 709/224 |

OTHER PUBLICATIONS

Hein et al., "Switching Technology the Local Network", Coriolis, (excerpts) pp. 1–4, Jan. 1997.*
Miller, Mark A., "Managing Internetworks with SNMP", M&T Books, (excerpts) pp. 1–7, Jun. 1997.*
Shahabi et al. "Knowledge Discovery from Users Web–Page Navigation", IEEE, pp. 20–29, 1997.*
Muller, Nathan J., "Improving Network Operations with Intellegent Agents", International Journel of Network Management, pp. 116–126, 1997.*
Choi et al., "A Method of Gathering End–to–End Management Information", IEEE, pp. 849–858, 1998.*
Goldszmidt, German S., "Load Management for Scaling up Internet Services", IEEE, pp. 828–835, 1998.*
Olken et al., "Object Lessons learned from a Distributed System for Remote Building Monitoring and Operation", ACM, pp. 284–295, Oct. 1998.*
Pattinson et al., "A network Model for Network Management Teaching", ACM, pp. 62–66, 1998.*

\* cited by examiner

*Primary Examiner*—Mark Rinehart
*Assistant Examiner*—Jason D. Cardone
(74) *Attorney, Agent, or Firm*—Thomas, Kayden, Horstemeyer & Risley, LLP (57) ABSTRACT

A system and method of collecting and maintaining historical top communicator information on a communication device. The system and method is located on a communication device, which is attached to a network, and responds to internal an external data requests for host information. A top communication storage device and an RMON protocol storage device are inspected by top communicator logic for communicator information. Non-user excluded information is stored within the top communication storage device and updated periodically, along with an RMON database, according to a RMON alarm/user history poller and a user defined timer.

17 Claims, 5 Drawing Sheets

SYSTEM AND METHOD OF COLLECTING AND MAINTAINING HISTORICAL TOP COMMUNICATOR INFORMATION ON A COMMUNICATION DEVICE

CROSS-REFERENCE TO RELATED APPLICATIONS

This application claims the benefit of U.S. Provisional patent application Ser. No. 60/108,122, filed on Nov. 12, 1998, and entitled "Method for Historically Collecting the Top Network Talkers," which is incorporated by reference herein in its entirety.

FIELD OF THE INVENTION

The present invention generally relates to a system and method of determining network activity. More specifically, the invention is related to a system and method for collecting and formatting information at individual nodes and facilitating the gathering all of the collected information from multiple nodes at a time when the effects of occupying network bandwidth are diminished, such that this information can be stored using standards based historical collection techniques.

BACKGROUND OF THE INVENTION

The advancement of technology has led to an increase in network traffic. Since a network is a collective resource, it is often useful for network managers to know which individuals are using a large percentage of the network's bandwidth, thereby causing network traffic. This information, collectively know as top communicator information, can be used in identifying network problems, verifying design solutions, or simply pointing out the individuals who are using a large share of the network.

Networks are often distributed over large areas and the traffic transmitted over the links between individual network nodes is both critical and expensive. Therefore, it is useful to collect a historical database of information relative to the activities taken by the individual nodes and to then gather all of the collected information from multiple nodes at a time when the effects of occupying network bandwidth are diminished. It is also useful to reduce the total amount of data required to derive this desired information.

A typical communication over the network generally involves two hosts, namely a source and a destination. In the interest of uniformity, hereinafter any host that is a source of communication will be referred to as a talker, any host that is a destination of communication will be referred to as a listener, and those hosts that appear in either source, destination, or both in the course of communication will be referred to as communicators. Knowing the talkers and listeners allows the network managers, system administrators, or other users of top communicator information generated by top communicator algorithms, to discover the implied direction of the communications, and to determine which network host is sending the most data (the talker), and which is destined to receive the most data (the listener). As is generally known, on most networks, the listener is the cause of most of the network traffic due to activities such as downloading of data, and other functions. Knowledge of this information can be used to pinpoint the cause of network traffic for future resolution.

The top communicators on a network are simply the network hosts that are actually involved in the most network traffic. However, whether these top communicators actually caused the amount of traffic that they are involved in is not considered in the calculation. Typically, on networks with multiple servers, it can be expected that the servers would be among the top communicators. Additionally, there may be network hosts that the user does not want to consider in the calculation of the top communicators, such as, but not limited to, a management station or key network devices. Further, this excess information may confuse the end user or force desired hosts out of the scope of network use calculation. By removing known, unnecessary hosts, the number of hosts in the scope of the talker calculations can be reduced from the number of unneeded hosts plus the number of desired hosts to only the number of desired hosts.

The Internet Engineering Task Force (IETF) is a standards body that develops and maintains protocols and other standards for the Internet. Among these standards is the Simple Network Management Protocol (SNMP) which is a network management protocol used in IP environments. This standard is used to communicate network management information. The information and protocols utilized for behavior and collection are described in Management Information Bases (MIBs). A MIB is part of the SNMP and is basically a data file which contains a complete collection of all objects that are managed in a network, wherein the objects are variables that hold information about the devices monitored. The prescribed method of collecting historical network data using SNMP is through the User History group of a Remote Monitoring Management Information Base (RMON MIB). As is well known to one of ordinary skill in the art, the User History group is yet one of many groups within the RMON MIB. Other groups include, but are not limited to, the Hosts group, which provides traffic statistics for each network node in a tabular form, and the Host Top N group, which extends the Host table by providing sorted host statistics.

ERMON implementations employ what are commonly referred to as probes. Probes are software processes which run on network devices to collect information about network traffic and store the information into a local MIB located on the communicator. There are differences between the use of either polling specific SNMP MIB data or using RMON MIBs for historical data collection purposes. With SNMP polling, a network management console must continually poll the SNMP probes to obtain MIB information. Gathering this information not only increases congestion on the network, it also places a large burden on the network management console to gather information. Further, there is a variable lag time inherent in any network communication which also affects SNMP queries.

In RMON, however, the probes themselves collect and maintain the historic information. Therefore, the network management console does not need to continually poll probes in order to ensure that this historical information is properly collected. Also, RMON is not affected by the variable qualities of network communications. These benefits provide both a dramatic reduction in network traffic and increased time related accuracy.

Two standard MIBs which describe remote network monitoring are the RMON MIBs, RFC 1757 and RFC 2021. Within RFC 1757 and 2021 MIBs there are a series of methods that presently can be used to calculate network top communicator information.

The Host TopN group of RFC 1757 can be used to calculate the top n communicators on the network; however, it yields only the Media Access Control (MAC) address, also known as the ethernet address, of the network hosts. Additionally, the collection times are not linked to historical collection and the overall data cannot be collected by the User History group since it is in the wrong data format. Further, this method only provides the communicator information. While either the talker or listener information can overlay the traditional communicator information if the implementor chooses to do so, unfortunately, only one piece of the information can be collected with this table. In addition, there is no standard method to communicate to the network manager which type of information is actually collected. Furthermore, there is no way to remove hosts from consideration in the calculations.

The nlHostTable of RFC 2021 can also be used to calculate the top n talkers, listeners, or communicators on the network. This calculation requires that the table be read through SNMP and stored by a management application at specific intervals. Each host seen by the network has an entry in the table, and finding the desired information requires a comparison of all of the hosts that the network has seen. This means that the use of this method requires a relatively large amount of network bandwidth. Additionally, there is a problem if multiple managers desire the same information in that they would either have to share the information over the network through some other means, or causes an increase in the network traffic by calculating the numbers themselves. Further, there is an additional increase in network traffic if multiple time interval calculations are to occur simultaneously.

Therefore, there is a need in the industry for a method of collecting and maintaining historical top communicator information on a communication device which can remove specific hosts from consideration in network activity calculations, provide the exact protocol specific address of the top communicators, yield results of all three types of communication, and, at the same time, utilize minimal bandwidth.

SUMMARY OF THE INVENTION

Briefly described, the invention provides a system and method of using standards based procedures to collect historical top communicator information. In addition to simply collecting this information historically, it has the benefit of being directly tied into the mechanism which performs collection instead of performing the collection independently, thereby preventing the collection from losing data. Further, it allows for multiple collections over different time intervals for the same segments of the network at the same time. Additionally, this invention includes the ability to remove known addresses from the calculation of the top communicators to prevent servers and other high use machines from being in the table.

In accordance with the first embodiment of the invention, a communication device, which is attached to a network, responds to internal and external data requests for host information. The communication device utilizes a communications module and an agent module to collect, maintain, and transmit data information either to a network management system or, to or from a user device. The invention utilizes an SNMP stack which specifies the implementation of the SNMP protocol within the communication device, thereby either retrieving data for immediate use by the network management system or retrieving data to be stored historically in the RMON database for future collection by the network management system.

A top communicator database and an RMON protocol database are inspected by top communicator logic for top communicator information. The RMON protocol database is automatically updated in real-time according to host interaction and the top communicator database is periodically updated as triggered by RMON alarm/user history poller interaction according to the RMON protocol database. An RMON database is also provided to store historical information collected by an RMON alarm/user history poller according to a user defined timer.

Finally, an exclusion algorithm is performed upon the top communicator information to exclude user specified hosts and their respective information, from being involved in the arrival of top communicator information.

The invention has numerous advantages, a few of which are delineated hereafter as examples. Note that the embodiments of the invention described herein posses one or more, but not necessarily all, of the advantages set out hereafter.

One advantage of the invention is that in addition to collecting historical information, the invention is directly tied into the mechanism that performs the collection, instead of performing the collection independently, thereby preventing the loss of data during collection.

Another advantage of the present invention is that it allows for multiple collections over different time intervals for the same segments of the network at the same time.

Another advantage of the present invention is that it includes the ability to remove known addresses from the calculation of the top communicators to prevent servers and other high use machines from always being in the table.

Another advantage of the present invention is that it reduces the amount of network traffic by performing top communicator calculations remotely and transmitting only the desired information instead of all of the information required to perform the calculations.

Other objects, features and advantages of the present invention will become apparent to one of reasonable skill in the art upon examination of the following drawings and detailed description. It is intended that all such additional objects, features and advantages be included herein within the scope of the present invention, as defined by the claims.

DESCRIPTION OF THE DRAWINGS

The present invention will be more fully understood from the detailed description given below and from the accompanying drawings of the embodiments of the invention, which however should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION

Figure 1:
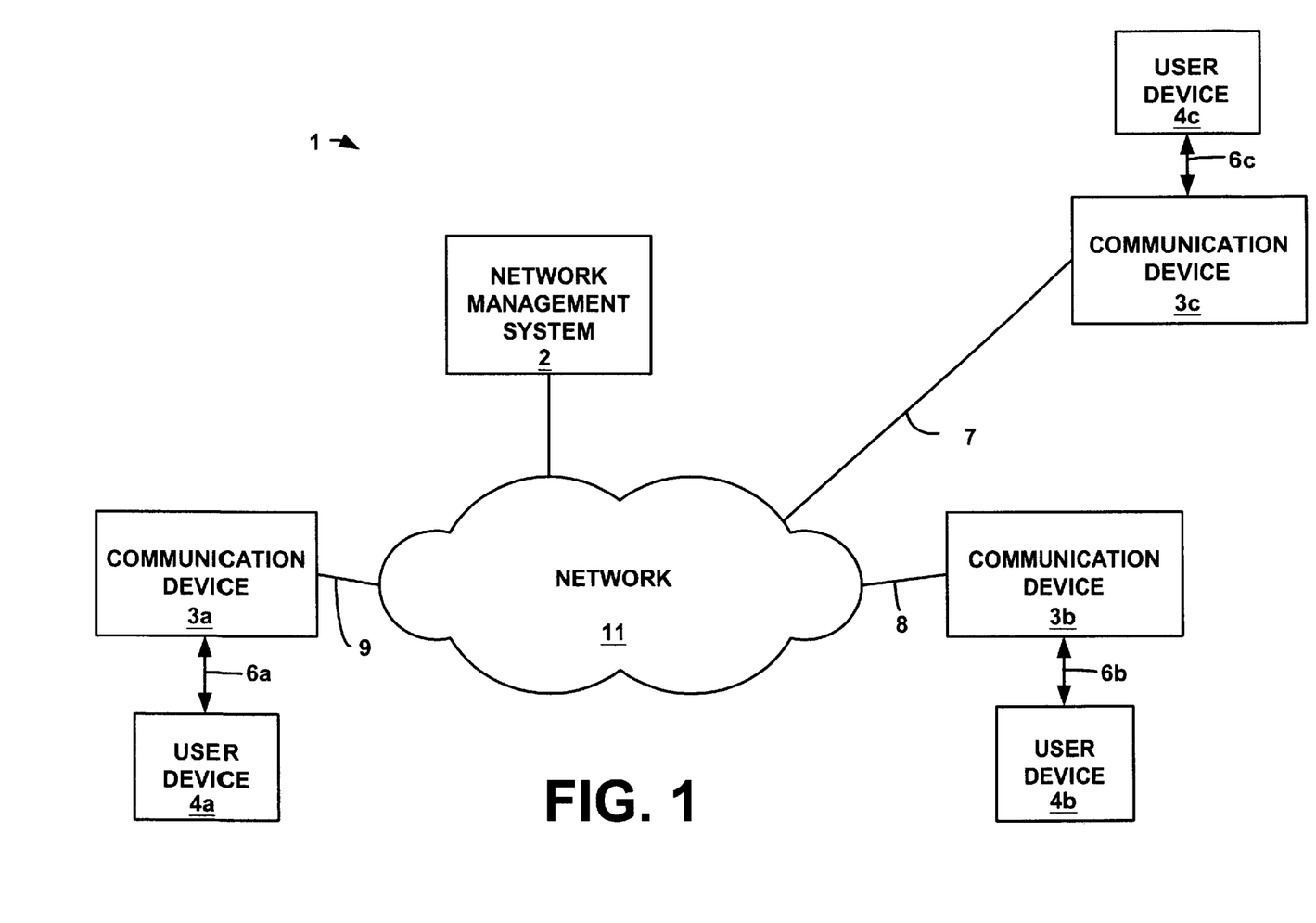
FIG. 1 shows a block diagram of a communication topography in which communications devices and a management system operate.

Turning now to the drawings, wherein like reference numerals designate corresponding parts throughout the drawings, FIG. 1 illustrates a communication topography 1 in which communications devices 3 and a network management system 2 operate. In general, the communications environment includes a plurality of user devices 4a, 4b, and 4c, each connected to a plurality of communication devices 3a, 3b, and 3c over connections 6a, 6b, and 6c respectively. The user devices 4 may include, but are not limited to, printers, servers, personal computers, and even an entire network. Communication devices 3a, 3b, and 3c can be any communication device such as a router, a switch, modem, network probe, or a frame relay access unit (FRAU) that communicates data over a communication network 11 in a conventional manner. Communication network 11 includes components that are known in the art and illustratively connect to communication devices 3a, 3b, and 3c over connections 7, 8, and 9, respectively. Connections 7, 8, and 9 are physical links and can be, for example, T1/E1 service or any analog or digital data service (DDS).

Communication network 11 can be any communication network including, but not limited to, frame relay networks, ATM networks, or ethernet networks and is typically characterized by a mesh network of links (not shown) interconnecting a matrix of intermediate nodes (not shown) through switches, hubs, or other interconnection devices. Typically, communication network 11 will contain many nodes. The communication link which interconnects communication device 3a and communication device 3b may be completely separate and distinct from that which interconnects communication device 3a and 3c. Alternatively, a segment of the two above-described communication links may be shared. Whether the links are separate or shared is a function of a number of factors and generally is determined by the service provider.

For purposes of describing the present invention, the invention will be described as residing in each individual communication device 3a, 3b, 3c and providing a service accessible through the network management system 2. The network management system 2 is utilized, among other reasons, to access the communication devices for purposes of retrieving information relating to top communicators. It will be known to one of ordinary skill in the art that a communication device 3 in accordance with the invention may also exist within the network 11.

Figure 2:
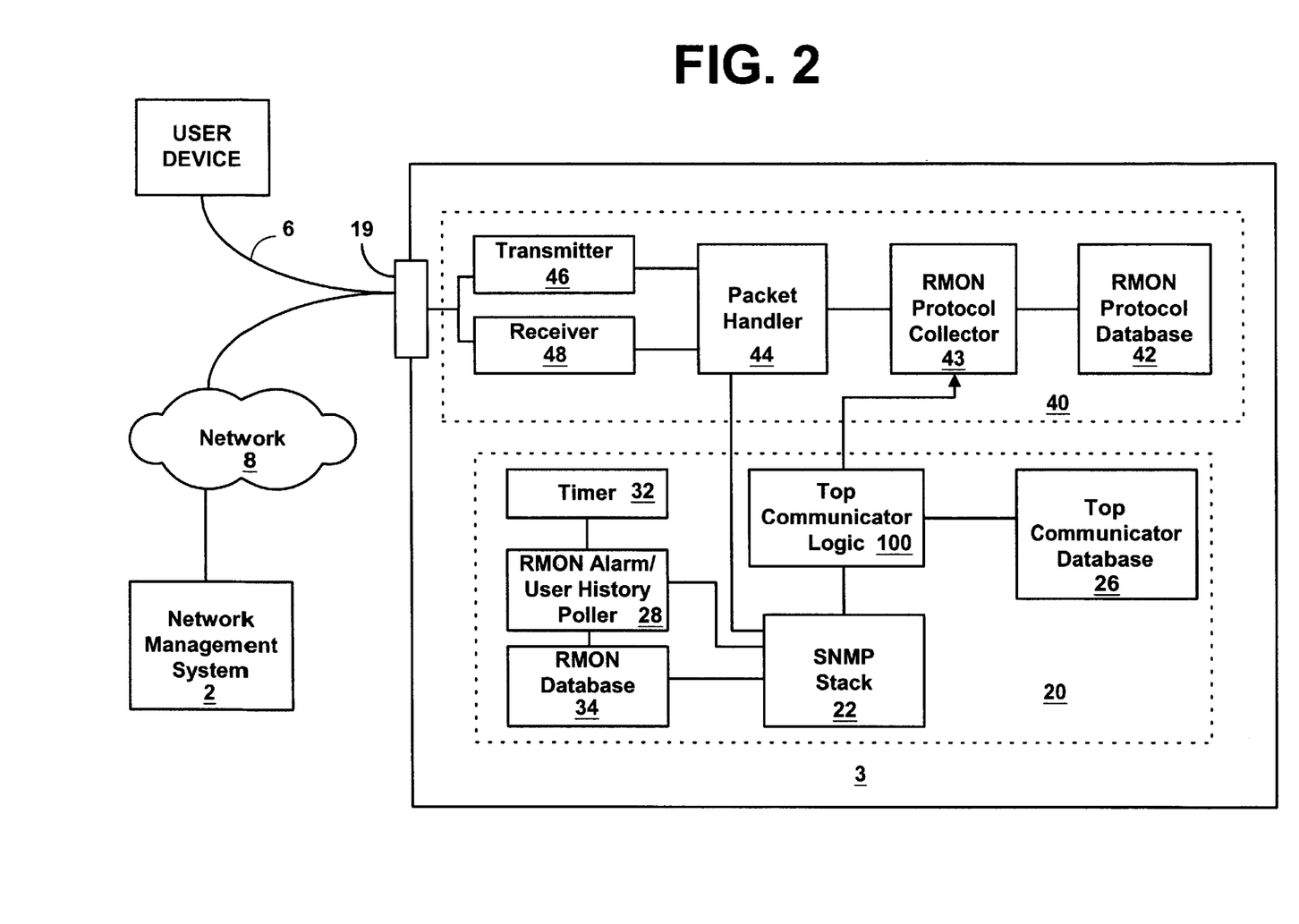
FIG. 2 shows a block diagram of one of the communication devices shown in FIG. 1, including interaction with a network management system.

FIG. 2 is a structural representation of a communication device 3 in accordance with the first embodiment of the invention. The communication device 3 handles data passed to or from a user device 4, shown in FIG. 1 via a communication interface 19. It should be noted that while the communication device 3 is described relative to a single communication interface 19, more than one interface 19 may be provided such that, for example, multiple T1 lines may communicate with a single communication device 3. Further, it is possible that one interface 19 can be logically subdivided into multiple individual interfaces, for example, a frame relay service or an ATM service. The collected data is then transmitted and inspected, thereby causing specific details about the data to be stored in statistics databases within the communication device for future extraction by internal or external devices. An in depth description as to data inspection and storage pertaining to the first embodiment of the invention shall be described hereinafter with reference to FIGS. 3A–3C. These stored details specify, among other things, the amount of data passing through the user device 4, the originator of the data, and the intended receiver of the data. The collection of this data from each host is referred to as host information. The network management system 2 is also connected to the communication device 3 through the network 11 via, for example, a T1 line. The network management system 2 is an administrative system which collects information from agents which run in the individual communication devices 3. This information is the same as the details which were previously collected by the communication device 3.

The communication device 3 is defined by an agent module 20 and a communications module 40. The agent module 20 is defined as follows. An SNMP stack 22 is connected to a packet handler 44 which is located on the communications module 40, the purpose of this connection being to provide the SNMfP stack 22 with the capability of receiving top communicator information requests from the network management system 2. The SNMP stack 22 is also connected to top communicator logic 100, an RMON database 34, and an RMON alarm/user history poller 28. The top communicator logic 100, in addition to being connected to the SNMP stack 22, is connected to a top communicator database 26 and an RMON protocol collector 43. The RMON protocol collector 43 is located within the communications module 40 and shall be discussed further hereinafter. The functions performed by the top communicator logic 100 will also be discussed hereinafter with reference to FIGS. 3A–3C.

In accordance with the first embodiment of the invention, the RMON alarm/user history poller 28, in addition to being connected to the SNMP stack 22, is connected to a user defined timer 32 and an RMON database 34. The RMON database 34 serves as an internal cache to the communication device 3 and is updated by the RMON alarm/user history poller 28 according to the user defined timer 32 in intervals of a user set allotment. These queries are commonly referred to as SNMP queries. The information with which the RMON database 34 is updated is retrieved from the top communicator database 26 via the SNMP stack 22 and top communicator logic 100, and stored within the RMON database 34 for future use. Additionally, any SNMP queries generated by a network management system 2 are also handled by the SNMP stack 22. However, unlike the timer 32 generated queries, the top communicator information is returned to the network management system 2 for unspecified use. In summary, the SNMP stack 22 specifies the implementation of the SNMP protocol within the communication device 3, thereby either retrieving top communicator information for immediate use by the network management system 2 or retrieving this information to be stored historically in the RMON database 34 for future collection by the network management system 2.

Referring now to the communications module 40, the RMON protocol collector 43 is connected to an RMON protocol database 42 which stores protocol specific information including, but not limited to, the host addresses for each specific protocol, the amount of traffic of a specific protocol type, and the amount of traffic intended for a send by a specific host. For clarification, it should be noted that this information is not the data which a user may be sending, but instead, is information identifying such data. The RMON protocol collector 43 is also connected to a packet handler 44 which transmits to the RMON protocol collector 43 information contained within packets received from a receiver 48. The packet handler 44 also collects and manipulates the packets of information before either their transmission to the network management system 2, or their transmission to or reception from the user device 4. Finally, as mentioned hereinabove, the packet handler 44 is also capable of determining whether the receiver 48 has received a request for SNMP MIB information including top communicator data. If the packet handler 44 determines that the request received by the receiver is for SNMP MIB information, it alerts the SNMP stack 22 of the request.

When the packet handler 44 determines that specific segments of the packets are allowed to be transmitted or received via the interface to the packet handler 44, meaning that there was no error in transmission of the information, the packet format is recognized as being valid for the network, and that the particular packet is legal on the network, the packets or segments of the packets are then transmitted to the RMON protocol collector 43. The RMON protocol collector 43 then analyzes the packets to assure that only specific information relating to allowable protocols, wherein allowance is defined by a network management system 2, is stored in the RMON protocol database 42 for later use. It will be appreciated for purposes of the invention, that FIG. 2 represents the use of a packet handler 44 having a single connection within the communications module 40, to the RMON protocol collector 43, the packet handler may also be connected to other logic within the communication device 3 which has not been illustrated.

Figure 3A:
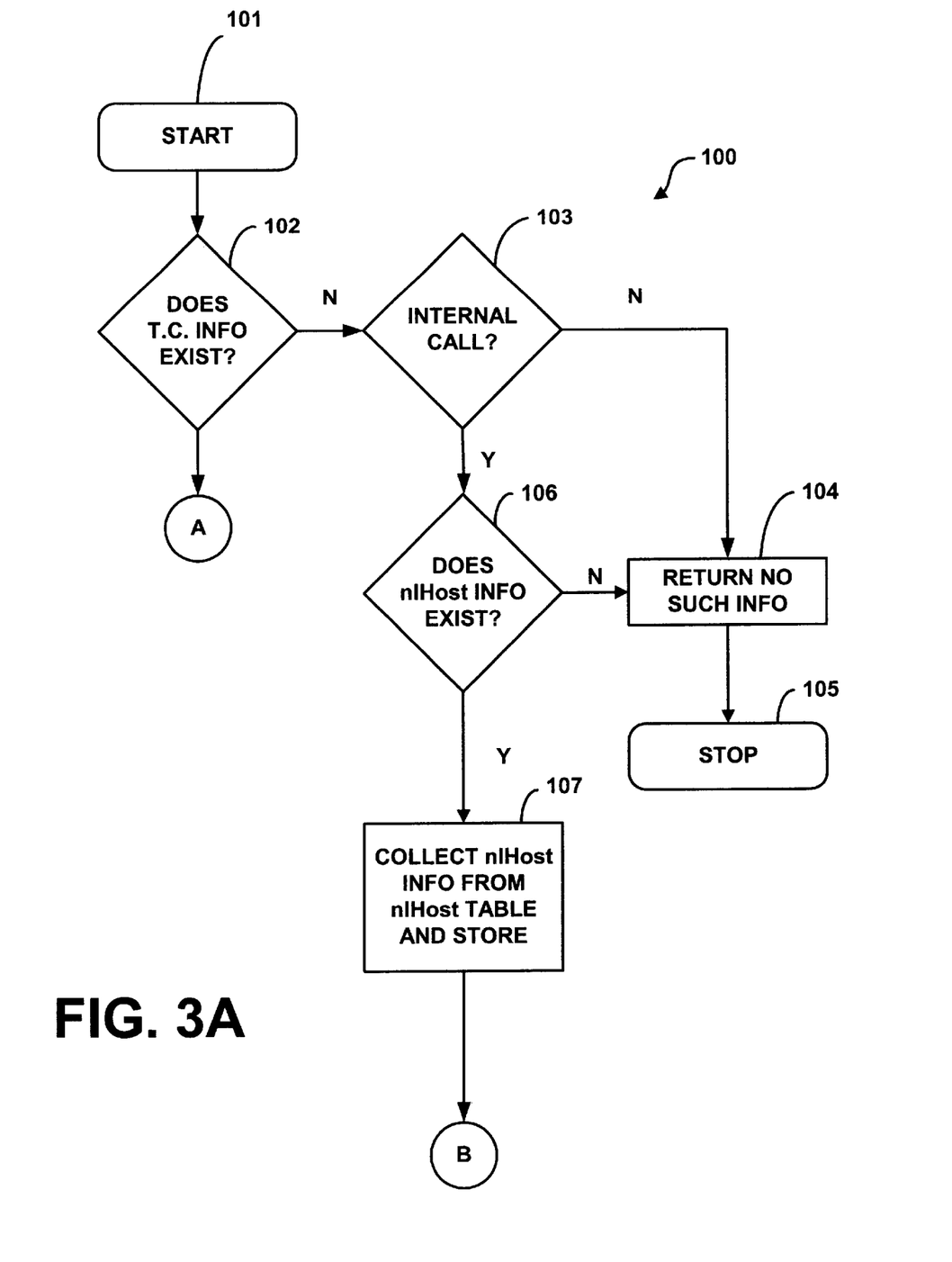
FIGS. 3A–3C show a flowchart representation of functions performed by top communicator logic within the communication device of FIGS. 1 and 2 in response to a data request.
Figure 3B:
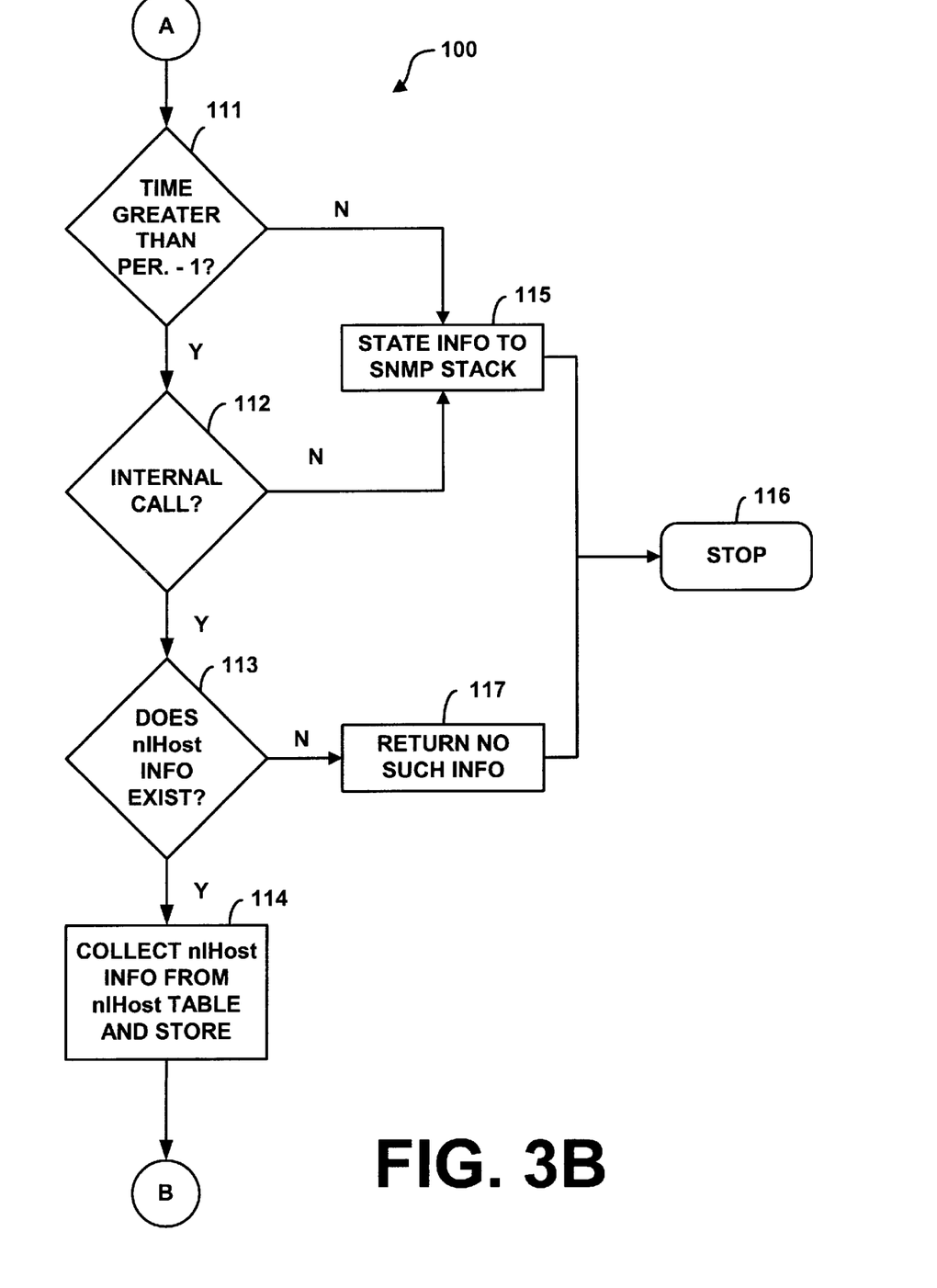
Figure 3C:
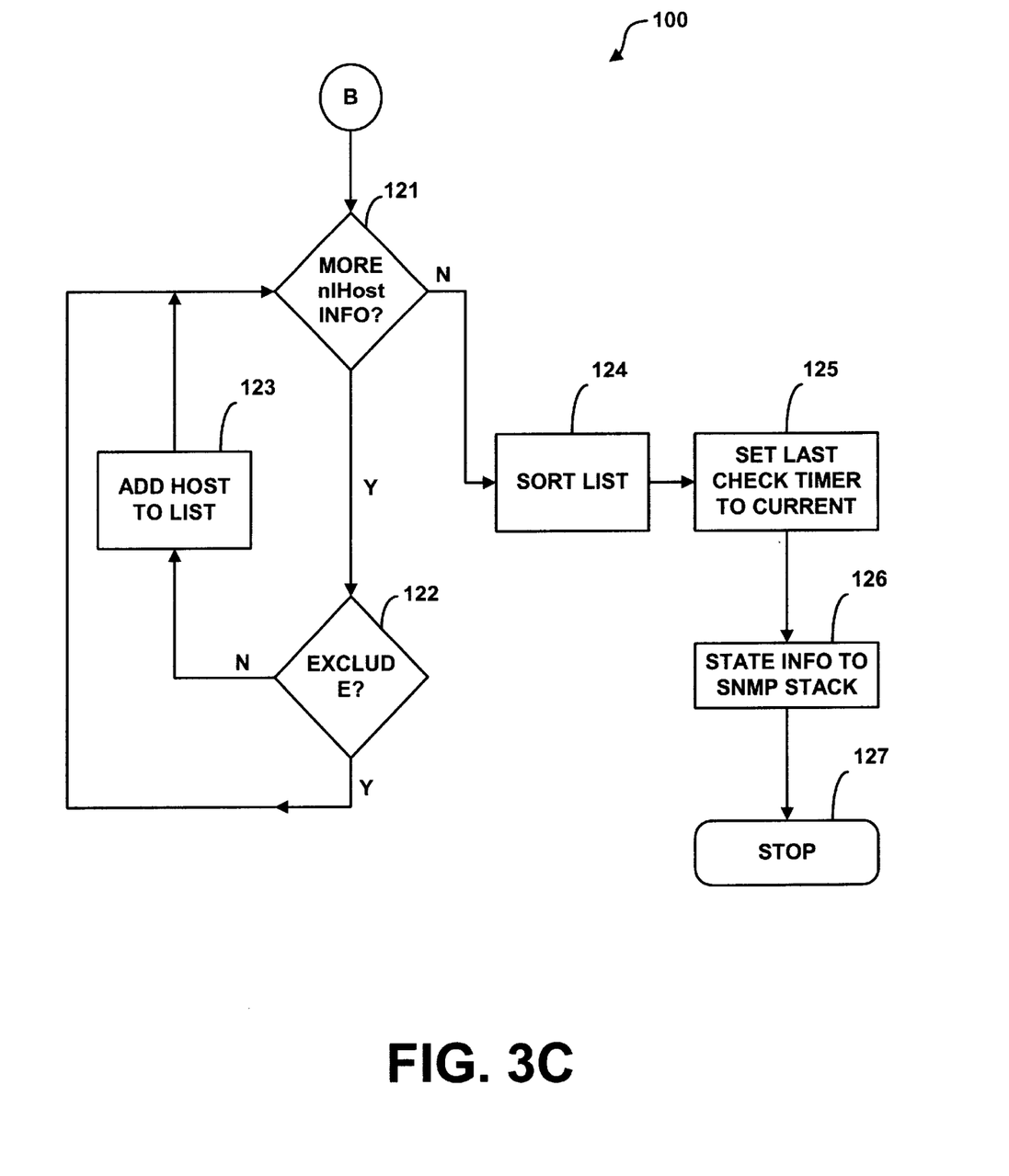

In accordance with the first embodiment of the invention, FIGS. 3A–3C functionally demonstrate the collection of host information as it is performed by the top communicator logic 100 within the communication device 3. It should be noted that the following is an example of collection within the communication device 3 and that some steps may be interchanged without differing from the essence of the invention.

In accordance with FIG. 3A, collection begins (step 101) with a top communicator information collection request from either the network management system 2 or the RMON alarm/user history poller 28. As previously described, if a collection request is received by the packet handler 44, it will identify the request as such and make the SNMP stack 22 aware that there is a request for such information. After the collection request is received by the SNMP stack 22, from either the network management system 2 or the RMON alarm/user history poller 28, and it is recognized to be a request for top communicator information, it is passed to the top communicator logic 100. At this point, a check is made by the top communicator logic 100 as to whether the information requested exists in the top communicator database 26 (step 102). When the result of a check for top communicator information within the top communicator database 26 (step 102) returns that the information does not exist, a check as to whether the call is internal or external is performed (step 103). In accordance with the invention, an internal call is de fined as any SNMP query generated by the RMON alarm/user history poller 28. An external call is defined as any SNMP query from the network management system 2. The existence of top communicator information within the top communicator database 26 shall be described with reference to FIG. 3B. If the call is not internal and the information is not available from the top communicator database 26, a return stating that no such information exists is returned to the SNMP stack 22 (step 104) for delivery to the network management system 2, upon which control is returned to the SNMP stack 22 for future internal or external queries (step 105).

If the top communicator information is not available from the top communicator database 26 and the call is internal, and therefore received from the RMON alarm/user history poller 28, a check is made by the RMON protocol collector 43 as to whether nlHost information on a specific interface exists (step 106). The nlHost information is the top communicator information that exists in the nlHost table of the RMON MIB, which is a collection of each host encountered by the communication device 3 and the information pertaining to that host. In the first embodiment of the invention, the nlHost table resides in the RMON protocol database 42. If nlHost information does exist in the RMON protocol database 42, nlHost information is collected from the nlHost table and a copy of the information is stored in the top communicator database 26. For a specific interface on the communications device 3, this information may include all hosts encountered, their addresses, and the amount of information intended for, or sent by, the listed hosts. Functions performed after collection of nlHost information are described in detail with reference to FIG. 3C. When nlHost information does not exist, the network management system 2 is returned a message informing it that no such information exists (step 104), upon which control is returned to the SNMP stack (step 105).

With reference to FIG. 3B, if the top communicator information is located within the top communicator database 26, a check is performed to determine whether the time since the last update performed by the top communicator logic 100 is greater than the collection time interval specified by timer 32-1 (step 111). When the last updated time is greater than the collection time interval-1, a check is performed by the top communicator logic 100 as to whether the request for user data was an internal or external-call (step 112). If the call was internal, a check is made by the RMON protocol collector 43 as to whether nlHost information for the specific interface exists (step 113) within the RMON protocol database 42. If nlHost information does exist in the RMON protocol database 42, top communicator information identifying the hosts which have been monitored by the communication device 3 is collected from the nlHost table (step 114) and a copy of this information is stored in the top communicator database 26. Once again, functions performed after collection of information are described in detail with reference to FIG. 3C.

As shown in FIG. 3B, if either, the time of the last update by the top communicator logic 100 was performed less than a collection interval specified by timer 32-1 (step 111), or the call received by the SNMP stack 22 was not an internal call (step 112), the network management system 2 is returned the top communicator information sought (step 115), after which control is returned to the SNMP stack (step 116) for future inquiries. If, however, the nlHost information does not exist in the RMON protocol database 42 (step 113), the network management system 2 is returned a message stating that no such information exists (step 117). Control is then returned to the SNMP stack (step 116).

FIG. 3C, as a continuation of FIGS. 3A and 3B, demonstrates performance by the communications device 3 after the step of collecting nlHost information from the nlHost table (step 107 or 114) is performed by the RMON protocol collector 43. In accordance with the first embodiment of the invention, a user provided exclusion inquiry is then performed by the top communicator logic 100. The exclusion inquiry examines the nlHost information to determine whether any hosts, and therefore associated host information, exist within the list of nlHost information collected in step 107 or 114, that have not been inspected according to a user provided host exclusion algorithm (step 121). If information on other hosts exists within the list of hosts collected in step 107 or 114, a single host is selected from the list and an exclusion algorithm is applied to that individual host to determine whether it is a user excluded host (step 122). If the host is to be excluded, as previously defined by a user, further checks are made to determine if other hosts exist within the list of hosts collected in step 107 or 114 (step 121). Then there has been a determination that other hosts exist within the list of hosts collected in step 107 or 114 and that they are not to be excluded from calculations, calculations are performed to obtain the change in the amount of data transmitted by, or intended for a particular host, between now and the last update time. This calculated data is then stored in a list of hosts to be handled later (step 123). The list of hosts collected in step 107 or 114 is checked in a similar fashion as described above until no more hosts exist in the list (step 121).

After each host in the list collected in step 107 or 114 is inspected, the host list generated in step 123 is sorted (step 124) by any known sorting algorithm and stored in the top communicator database 26. The timer 32 is then set to reflect the time of the last update performed by the top communicator logic 100 (step 125).

Finally, the nlHost information collected by the top communicator logic 100 is transmitted to the SNMP stack 22 for return to either the network management system 2 or the RMON Alarm/User History Poller 28 (step 126), after which control is once again returned to the SNMP stack 22 for future transactions (step 127).

The top communicator system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description of the present invention, it is should be noted that it will be obvious to those skilled in the art that many variations and modifications may be made to the embodiments discussed herein without substantially departing from the principles of the present invention. All such variations and modifications are intended to be included herein within the scope of the present invention, as set forth in the following claims. Further, in the claims hereinafter, the corresponding structures, materials, acts, and equivalents of all means or step plus function elements are intended to include any structure, material, or acts for performing the functions in combination with either claimed elements as specifically claimed.

The following is claimed:

1. A system for collecting and maintaining historical top communicator information on a communication device for retrieval by a source, comprising;
   an SNMP stack for receiving a retrieval request from said source;
   a first storage area for storing specific host information concerning each host;
   a second storage area for storing specific user-defined top communicator information which has not been excluded from said first storage area, said top communicator information identifies a plurality of hosts involved in most network traffic by indicating an amount of network traffic that passes through each host, an originator of said network traffic, and an intended receiver of said network traffic;
   a third storage area for storing historical information retrieved from said second storage area according to a sampling period;
   wherein said SNMP stack specifies the implementation of SNMP protocol within said communication device to retrieve said top communication information from said communication device and to store said top communication information historically from said second storage area to said third storage area.

2. The system of claim 1, wherein said specifying the implementation of SNMP protocol within said communication device is performed by a top communicator logic.

3. The system of claim 2, wherein said timer is defined by a user.

4. The system of claim 1, wherein said source is selected from the group consisting of an internal source and an external source.

5. The system of claim 4, further comprising a user history poller, wherein said poller initiates the updating of said third database based upon a timer.

6. The system of claim 1, wherein said first storage area is a database.

7. The system of claim 1, wherein said second storage area is a database.

8. The system of claim 1, wherein said third storage area is a database.

9. A method of collecting and maintaining historical top communicator information on a communication device for retrieval by a source, comprising the steps of:
   receiving host information and storing specific information concerning each host in a memory within a first storage area;
   excluding user defined top communicator information from said specific information stored in said first storage area to produce a sampled version, said top communicator information identifies a plurality of hosts involved in the most network traffic by indicating an amount of network traffic that passes through each host, an originator of said network traffic, and an intended receiver of said network traffic;
   storing said sampled version within a second storage area;
   calculating said top communicator information by utilizing said sampled version;
   utilizing a third storage area to store historical samples of said sampled version from said second storage area for collection by said source according to a sampling period; and
   utilizing said sampling period of said third storage area to control the collection and calculation of data in said second storage area.

10. The method of claim 1, wherein said source is selected from a group consisting of an internal source and an external source.

11. The method of claim 2, wherein said external source is a network management system.

12. The method of claim 1, wherein said step of updating said third storage area is performed based upon a user specified period.

13. The method of claim 1, wherein said first database is an nlHost table.

14. The method of claim 1, wherein said third storage area is an RMON user history table.

15. The method of claim 1, wherein said first storage area is a database.

16. The method of claim 1, wherein said second storage area is a database.

17. The method of claim 1, wherein said third storage area is a database.

* * * * *